United States Patent
Schlueter et al.

(10) Patent No.: US 11,255,687 B2
(45) Date of Patent: Feb. 22, 2022

(54) METHOD FOR TRAJECTORY PLANNING OF A MOVABLE OBJECT

(71) Applicant: Robert Bosch GmbH, Stuttgart (DE)

(72) Inventors: Henning Schlueter, Steinheim an der Murr (DE); Mathias Buerger, Stuttgart (DE); Philipp Christian Schillinger, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 16/560,728

(22) Filed: Sep. 4, 2019

(65) Prior Publication Data

US 2020/0088536 A1    Mar. 19, 2020

(30) Foreign Application Priority Data

Sep. 19, 2018   (DE) .......................... 102018215949.1

(51) Int. Cl.
*G01C 21/34* (2006.01)
*B62D 1/28* (2006.01)
(Continued)

(52) U.S. Cl.
CPC ......... *G01C 21/3492* (2013.01); *B62D 1/283* (2013.01); *G05D 1/0077* (2013.01);
(Continued)

(58) Field of Classification Search
CPC ............ G01C 21/3492; G01C 21/3461; G01C 21/34446; B62D 1/283; B62D 15/0285; B62D 15/025; G05D 1/0077; G05D 1/0217; G05D 1/0221; G05D 1/0225; G06K 9/00812; B60W 60/0021; B60W 60/0011

See application file for complete search history.

(56) References Cited

U.S. PATENT DOCUMENTS

| | | | | |
|---|---|---|---|---|
| 10,133,275 | B1* | 11/2018 | Kobilarov | G05D 1/0272 |
| 2017/0277195 | A1* | 9/2017 | Frazzoli | B60W 60/0011 |

OTHER PUBLICATIONS

L. I. Reyes Castro et al., "Incremental Sampling-Based Algorithm for Minimum-Violation Motion Planning", 52nd IEEE Conference on Decision and Control, 2013, pp. 3217-3224.

(Continued)

*Primary Examiner* — Rodney A Butler
(74) *Attorney, Agent, or Firm* — Norton Rose Fulbright US LLP; Gerard Messina (57) ABSTRACT

A method for determining a movement trajectory (MT) for a movable object (a vehicle) in a rule-based trajectory planning (TP) system, TP being performed based on minimizing overall costs of a cost function (CF), the CF considering violation costs (VC) which arise for each MT section from a potential respective violation of violatable rules as to the section, the rule violation (RV) including a state/transition RV, the state RV indicating a violation of a state rule indicating an impermissible state of the object; the transition RV indicating a violation of a transition rule indicating an impermissible state transition, the state RV being assigned a time-dependent cost amount of the VC, and the transition RV being assigned a fixed, time-independent cost amount of the VC, so that overall costs for a MT for each section violating a violatable rule depend on the time-dependent/fixed cost amount assigned to the violated rule.

13 Claims, 4 Drawing Sheets

(51) Int. Cl.
  *G05D 1/00*   (2006.01)
  *G05D 1/02*   (2020.01)
  *G06K 9/00*   (2022.01)
(52) U.S. Cl.
  CPC ......... *G05D 1/0217* (2013.01); *G05D 1/0221* (2013.01); *G05D 1/0225* (2013.01); *G06K 9/00812* (2013.01)

(56) References Cited

OTHER PUBLICATIONS

C.-I. Vasile et al., "Minimum-Violation SCLTL Motion Planning for Mobility-On-Demand", IEEE International Conference on Robotics and Automation (ICRA), 2017, pp. 1481-1488.
Nolte, et al.: "Representing the Unknow—Impact of Uncertainty on the Interaction between Decision Making and Trajectory Generation", arxiv.org, Cornell University Library, 201 Olin Library Cornell University Ithaca, NY 14853, 24. Apr. 2018, XP081178111, pp. 1-7.

* cited by examiner

METHOD FOR TRAJECTORY PLANNING OF A MOVABLE OBJECT

RELATED APPLICATION INFORMATION

The present application claims priority to and the benefit of German patent application no. 10 2018 215 949.1, which was filed in Germany on Sep. 19, 2018, the disclosure of which is incorporated herein by reference.

FIELD OF THE INVENTION

The present invention relates to methods for the rule-based trajectory planning of movable objects in general, taking permissible rule violations into consideration.

BACKGROUND INFORMATION

In general, a set of predefined rules is taken into consideration for the rule-based trajectory planning to ascertain a meaningful trajectory between two positions. For example, a logic description language, the so-called linear temporal logic (LTL), may be used for describing the rule, which maps a task specification in the form of an LTL specification. From the LTL specification, it is possible to plan and optimize permissible movement trajectories based on the rules.

The trajectory planning for movable objects in rule-based planning systems is based on the calculation of a cost function, with the aid of which an iterative optimization of the trajectory is carried out. Depending on the optimization goal, the optimization is, in general, carried out based on a minimization of the time required for moving the movable object along the trajectory, the required energy consumption or the like. However, one problem is to define a valid cost function which takes into consideration the case that a violatable rule is violated. The parameterization of the costs for the violation of a rule represents a particular difficulty.

A trajectory planning technique is discussed, for example, in L. I. Reyes Castro et al., "Incremental sampling-based algorithm for minimum-violation motion planning", 52nd IEEE Conference on Decision and Control, December 2013, pages 3217 through 3224, in which an optimal movement trajectory is ascertained for conflicting negotiation rules by assigning the costs for a rule violation to corresponding rules.

The publication by C.-I. Vasile et al., "Minimum-violation scLTL motion planning for mobility-on-demand", IEEE International Conference on Robotics and Automation (ICRA), May 2017, pages 1481 through 1488, additionally refers to integrating the trajectory planning, the costs for the violation being assigned to a rule when it is not possible to interpret a rule by a predefined set of syntactic scLTL rules.

A need therefore exists to provide violation costs for a trajectory determination method for the violation of a rule in trajectory planning.

SUMMARY OF THE INVENTION

According to the present invention, a method for determining a movement trajectory for a movable object as recited in Claim 1 and a method for guiding a movable object, a device, and a movable object as recited in the other independent claims are provided.

Further embodiments are stated in the dependent claims.

According to a first aspect, a method for determining a movement trajectory for a movable object, in particular a vehicle, in a rule-based trajectory planning system is provided, a trajectory planning being carried out based on a minimization of overall costs according to a cost function to determine the movement trajectory, the cost function taking violation costs into consideration, which arise for each trajectory section of the movement trajectory from a potential respective violation of one or multiple violatable rules with respect to the trajectory section, the rule violation including a state rule violation and/or a transition rule violation, the state rule violation indicating a violation of a state rule which indicates an impermissible state of the movable object, and the transition rule violation indicating a violation of a transition rule which indicates an impermissible state transition, the state rule violation being assigned a time-dependent amount of the violation costs, and the transition rule violation being assigned a fixed, in particular time-independent amount of the violation costs, so that the overall costs for a movement trajectory for each trajectory section which violates a violatable rule depend on the time-dependent or fixed cost amount assigned to the violated rule.

The ascertainment of optimized movement trajectories is, in general, an iterative process in which costs, which are ascertained according to a predefined cost function, are minimized. This means that a movement trajectory is selected from a multitude of trajectory candidates for which the lowest costs are ascertained.

The cost function may be defined according to an optimization goal which, in general, includes at least one time-based component (in particular as a function of the time for negotiating the particular trajectory). In this way, the optimization goal may be the minimization of the time until the destination is reached, a reduction in the energy consumption, which is also time-dependent, a reduction in the harmful substance emissions and the like.

The rule description underlying the trajectory planning defines permissible and impermissible system states based on the formulation of rules. The rule description includes a set of rules, which may include violatable rules and non-violatable rules. The ascertainment of trajectory candidates takes into consideration that the non-violatable rules are absolutely adhered to, and that the violation of violatable rules may be avoided.

Indicating rules as violatable allows the trajectory planning, if necessary, to violate one or multiple of the violatable rules and to take the rule violation into consideration with additional costs in the underlying cost function. For this purpose, the system states and transitions between system states causing a rule violation are accordingly additionally provided with different violation costs. In particular, rule violations which relate to state transitions are provided with time-independent fixed amounts (violation costs), and rule violations which relate to impermissible system states are provided with time-dependent amounts (violation costs). It is possible to ascertain the corresponding violation costs by multiplying the time-dependent violation costs with a duration corresponding to the duration of the system state during which the trajectory planning provides trajectory sections on which a rule violation exists.

Furthermore, the time-dependent cost amount may be ascertained by multiplication with a duration which is needed to move the object along the particular trajectory section.

It may be provided that the trajectory planning includes the ascertainment of multiple trajectory candidates, from which the trajectory candidate having the lowest overall costs is selected as the movement trajectory.

According to one specific embodiment, the trajectory planning may include a sampling-based search method, in particular an RRT* method. Known trajectory planning methods generally include methods which already take the respective costs for trajectory sections into consideration during the or for the creation of the movement trajectory candidates. For example, in the rapidly exploring random trees (RRT) method, it may be provided to consider the respective costs of the trajectory section based on the creation of a random tree. Starting from a starting point, the trajectory is incrementally developed to meet a final condition, and the respective costs of the trajectory sections are added up to obtain the overall costs for the evaluation of the trajectory.

In particular, the trajectory planning may include the creation of a tree whose nodes indicate states and/or positions of the object, and whose connections indicate trajectory sections between the positions of the particular nodes, the creation of the tree including the following steps:
  providing a new node which corresponds to a sampled position of the object;
  determining multiple paths from the new node to the starting node of the tree;
  ascertaining overall costs for the multiple paths; and
  connecting the new node to the preceding node to which the path having the lowest overall costs belongs.

It may be provided that it is checked for already set nodes, with the aid of the cost function, whether these may be achieved by the new node having lower costs, and, if this is the case, these are connected to the new node.

Furthermore, the cost function may be formulated according to an optimization goal which takes the duration for negotiating the respective trajectory section into consideration.

According to a further aspect, a method for guiding a movable object along a movement trajectory is provided, which is ascertained according to the above method.

In particular, steering interventions and forward movements of the movable object may be controlled as a function of the movement trajectory.

As an alternative, driving instructions for guiding the movable object may be output as a function of the movement trajectory, in particular in the form of navigation instructions by a navigation system.

According to a further aspect, a device for determining a movement trajectory for a movable object, in particular a vehicle, in a rule-based trajectory planning system is provided, the device being configured to carry out a trajectory planning based on a minimization of overall costs according to a cost function to determine the movement trajectory, the cost function taking violation costs into consideration which arise for each trajectory section of the movement trajectory from a potential respective violation of one or multiple violatable rules with respect to the trajectory section, the rule violation including a state rule violation and/or a transition rule violation, the state rule violation indicating a violation of a state rule which indicates an impermissible state of the movable object, and the transition rule violation indicating a violation of a transition rule which indicates an impermissible state transition, the state rule violation being assigned a time-dependent amount of the violation costs, and the transition rule violation being assigned a fixed, in particular time-independent amount of the violation costs, so that the overall costs for a movement trajectory for each trajectory section which violates a violatable rule depend on the time-dependent or fixed cost amount assigned to the violated rule.

According to a further aspect, a movable object, in particular a vehicle, including the above device, a drive system, a steering system and a sensor system for detecting the surroundings of the object is provided, the device activating the drive system and the steering system as a function of surroundings states, in particular positions of surroundings objects and surroundings areas for moving the object along the particular movement trajectory.

In addition to a vehicle, the movable object may also be an in particular automated or semi-automated robot, a movable, in particular automated or semi-automated, production machine, or a movable, in particular automated or semi-automated, tool.

Specific embodiments are described in greater detail hereafter based on the accompanying drawings.

DETAILED DESCRIPTION

A method is described hereafter by which a trajectory planning may be carried out for a movable object based on a predefined rule base. The optimization goal is to correspond to the time until the destination is reached. The following description is provided based on the example of a trajectory planning for a vehicle which is to leave a parking facility via an exit on a particular lane. The trajectory planning is to determine a movement trajectory of the vehicle along which the vehicle may be guided quickly, taking predefined movement rules into account. Moreover, non-negotiable areas are indicated, which may indicate positions of other vehicles or buildings, for example. While the movement rules are indicated as violatable rules, i.e., as rules which, if necessary, may be ignored taking a disadvantage in a cost function of the trajectory planning into consideration, the non-negotiability rules represent non-violatable rules since, in reality, it is not possible to traverse buildings or other obstacles.

Figure 1:
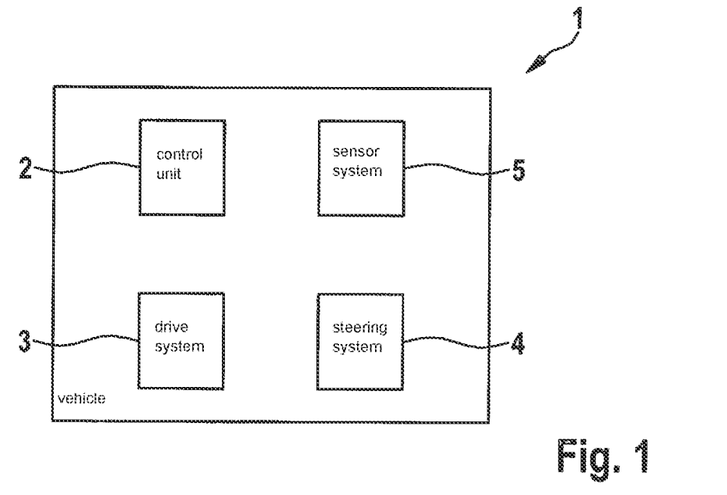
FIG. 1 shows a schematic representation of a movable object for which a trajectory planning is to be carried out.

FIG. 1 shows a schematic representation of a movable object, which may be configured as a vehicle 1. Vehicle 1 may include a control unit 2, which is configured to carry out the trajectory planning and execute an ascertained movement trajectory. To carry out a movement, control unit 2 may control vehicle 1 with the aid of activations and interventions in a drive system 3 and in a steering system 4. For this purpose, steering interventions and forward movements may be variably predefined in a manner known per se for following an ascertained movement trajectory.

For control of vehicle 1, surroundings states may be detected with the aid of a sensor system 5. Sensor system 5 may, for example, include a camera, another sensor system usable for object detection in the surroundings of the vehicle, such as ultrasonic sensor system and the like. With the aid of sensor system 5, it is possible to recognize and identify positions of surroundings objects and surroundings areas (roadways, green spaces, etc.), so that a surroundings map may be ascertained as a function of areas which are not negotiable, and may be used as a basis for non-negotiability rules.

The starting point of the method described hereafter is a task specification in the form of a linear temporal logic (LTL), in particular a co-safe linear temporal logic (scLTL). This represents a description language for a task specification of a task to be solved, which includes temporal modalities. Each scLTL task specification may be translated in a deterministic finite automaton.

Figure 2:
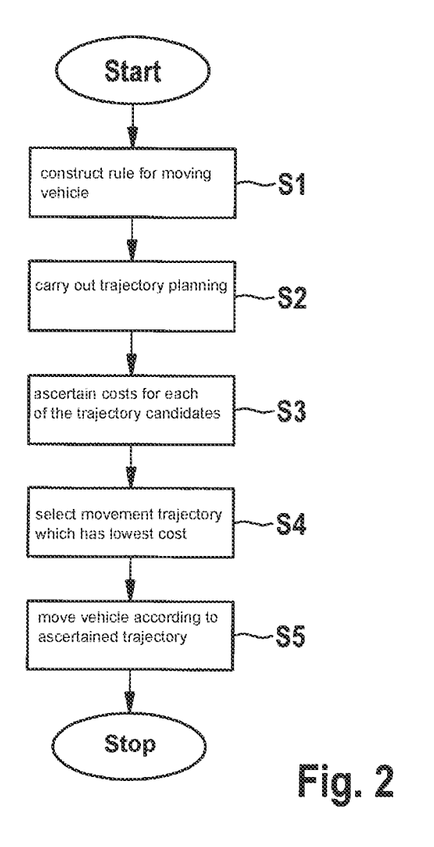
FIG. 2 shows a flow chart to illustrate a method for carrying out a trajectory planning.

FIG. 2 shows a flow chart to illustrate the method for carrying out the trajectory planning.

In step S1, a rule base for moving vehicle 1 is constructed from the surroundings map detected by the sensor system, a surroundings map retrievable from a map memory, and a predefined LTL description. A rule base may be expressed, for example:
1. Non-negotiable areas indicated in the surroundings map must not be traversed.
2. When on lane a, do not change to lane b.
3. Do not drive on a lane in the opposite driving direction.

This rule base includes a non-violatable rule with rule 1, since the trajectory planning must not, under any circumstance, provide that an object in the vehicle surroundings may be traversed.

Rules 2 and 3, in contrast, represent violatable rules which may be ignored or violated in some circumstances.

In step S2, a trajectory planning is carried out. The trajectory planning may be carried out according to different methods which are known per se from the related art. The methods, in general, ascertain a multitude K of trajectory candidates.

In step S3, the costs for each of the trajectory candidates are ascertained according to a predefined cost function. Each trajectory candidate includes a multitude N of consecutive trajectory sections, whose respective costs TK are calculated and added up for each trajectory candidate.

The cost function may be determined according to:

$$TK_{k \in 1 \ldots K} = \sum_{i=1}^{N} \left( b \cdot T_i + \sum_{r=1}^{R} VK_{fix,i,r} + VK_{var,i,r} \cdot T_i \right)$$

for each of the K trajectory candidates.

The conventional costs for negotiating each trajectory section correspond to $b \cdot T_i$. The movement costs are thus proportional to the duration required to negotiate the respective trajectory section.

Violation costs VK for violating a violatable rule are ascertained accordingly for each of the trajectory sections. A distinction is made in this between a transition rule violation and a state rule violation of a violatable rule.

A transition rule violation relates to a rule related to a state transition. According to the above example, rule 2 "When on lane a, do not change to lane b" corresponds to a check for a state transition, namely whether the considered trajectory section provides a change in the lane.

A state rule violation exists when the rule indicates an impermissibility of a state of vehicle 1. For example, a state rule violation of a trajectory section exists when vehicle 1 is situated in an impermissible position indicated by a violatable rule. According to the above example, a violation of the rule "Do not drive on a lane in the opposite driving direction" by a corresponding trajectory section corresponds to a state rule violation.

Now, violation costs VK are assigned to a set of violatable rules R. The violation costs indicate a time-dependent amount $VK_{var,i,r}$ for state rule violations, so that the longer the system state violating the respective state rule lasts, the higher are the violation costs. In contrast, for a transition rule violation, the violation costs indicate a fixed cost amount $VK_{fix,i,r}$ which is time-independent since the transition between system states cannot be assigned any duration.

The violation costs $VK_{var,i,r}$, $VK_{fix,i,r}$ may be fixedly predefined for each of the violatable rules, where in general it applies that when $VK_{var,i,r} \neq 0$, then $VK_{fix,i,r}=0$, and vice versa.

In step S4, a movement trajectory which has the lowest costs according to the above cost function is selected from the trajectory candidates.

In step S5, vehicle 1 is moved according to the ascertained trajectory.

The distinction of the violation costs between transition rule violations and state rule violations also allows violation costs for state rule violations whose amount is determined by the duration during which the rule violation exists to be adequately considered.

This kind of consideration of violation costs may already be taken into account in the trajectory planning when the used method uses the overall costs to create the movement trajectory to be ascertained.

Figure 3:
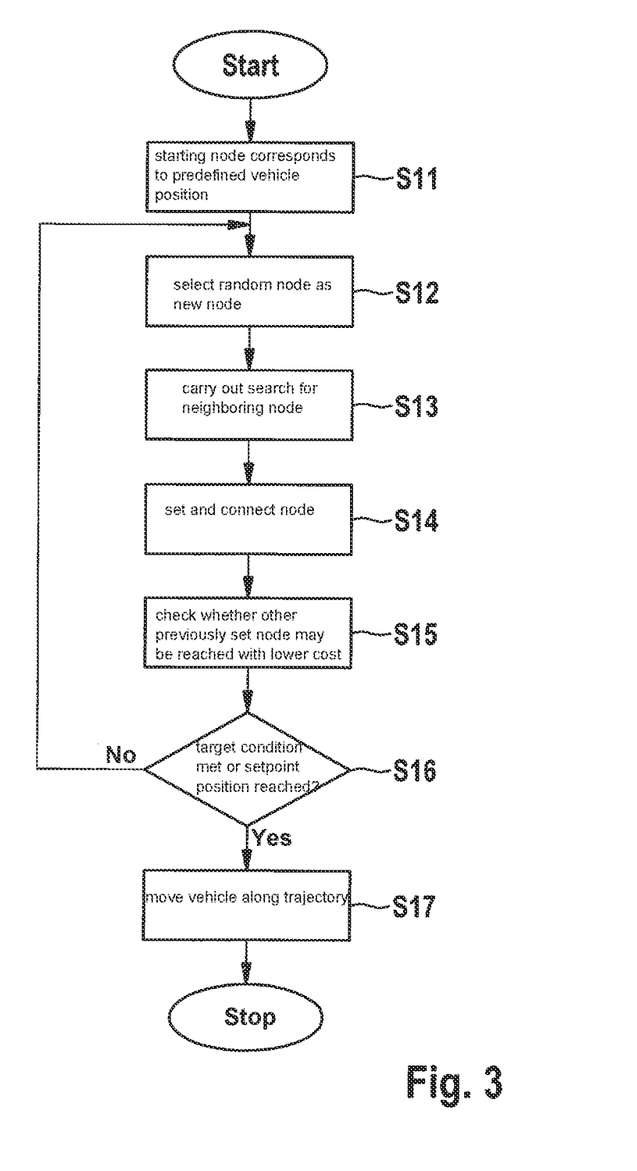
FIG. 3 shows a flow chart to illustrate an RRT* method for carrying out a trajectory planning.

For example, the above cost calculation may be considered in a sampling-based search method, such as a rapidly exploring random tree (RTT*) method, which is explained in greater detail based on the flow chart of FIG. 3.

A rapidly exploring random tree (RRT*) method for determining an optimal movement trajectory for vehicle 1 is explained hereafter. The rapidly exploring random tree (RRT*) method is a probabilistic approach to solving a trajectory planning. In this method, alternatively a tree is virtually constructed, whose nodes correspond to a position of the vehicle and its branches to the trajectory sections. Each node may additionally be assigned an overall cost value.

The tree is constructed by expanding it with new nodes with the aid of randomized heuristics in the state space until a setpoint state is reached. The expansion of the tree is only allowed if none of the non-violatable rules are violated. The path of the trajectory results by reverse consideration proceeding from the found setpoint state (end node) to the starting point (starting node).

In detail, step S11 proceeds from a starting node which corresponds to a particular predefined vehicle position.

To create a new node, in step S12 initially a random node which is able to indicate an arbitrary position of vehicle 1 in the space under consideration is selected according to a random number function.

Proceeding from the new node, in step S13 a search is carried out, for the neighboring node from the existing tree, proceeding from the new node, within a predefined distance which
  does not violate a non-violatable rule;
  is possible according to a movement model of the vehicle (no acute angles negotiable with respect to a preceding trajectory section); and
  is minimal according to the overall costs of the previously formed trajectory of the tree.

The overall costs result from the costs assigned to the particular neighboring node, plus the costs for the trajectory section (the new edge of the tree) to the new node. The neighboring node which results in a trajectory having the lowest overall costs is selected as the preceding node for the new node.

In the ascertainment of the costs, the violation costs as described above with respect to the method of FIG. 2 are also ascertained. It is accordingly ascertained whether the consideration of the trajectory section between the new node and the considered neighboring node represents a violation of a violatable rule. If a recognized rule violation represents a state rule violation, a duration for moving vehicle 1 along the considered trajectory section is determined in a manner known per se from driving condition data for the position of the preceding node, route characteristics and the like, and the costs are accordingly determined as a function of a time-dependent amount $VK_{var,i,r}$ of the violation costs, based on (multiplied by) the duration.

If a recognized rule violation represents a transition rule violation, the costs are accordingly determined as a function of a fixed amount $VK_{fix,i,r}$ of the violation costs.

In step S14, the node is accordingly set and connected to the found selected preceding node by a corresponding trajectory section.

In step S15, it is now possible to check whether other previously set nodes of the tree may be reached with lower overall costs via the new node. All or a portion of the previously set (considered) nodes are checked in the process. This takes place under the assumption of a connection, i.e., trajectory section, of the new node to the considered node, and an ascertainment of the corresponding overall costs. If the newly calculated overall costs are lower than the overall costs previously assigned to the considered node, the connection, i.e., trajectory section of the considered node, to its preceding node is cancelled, and the new node is connected to the considered node via a corresponding connection (trajectory section).

In step S16, it is checked whether the target condition is met or the setpoint position is reached. If the target condition is not met (alternative: no), the method is continued with step S12; otherwise, the method is continued with step S17.

In step S17, vehicle 1 is moved along the found trajectory.

As a result of the above RRT* method, which is known per se, it is possible to consider rules which are violatable for the trajectory planning by adapting the overall costs, the violation costs in the case of a state rule violation being determined as a function of a duration during which this rule violation exists. In contrast, rule violations relating to state transitions are considered as a fixed cost amount without time reference in the calculation of the overall violation costs.

Figure 4:
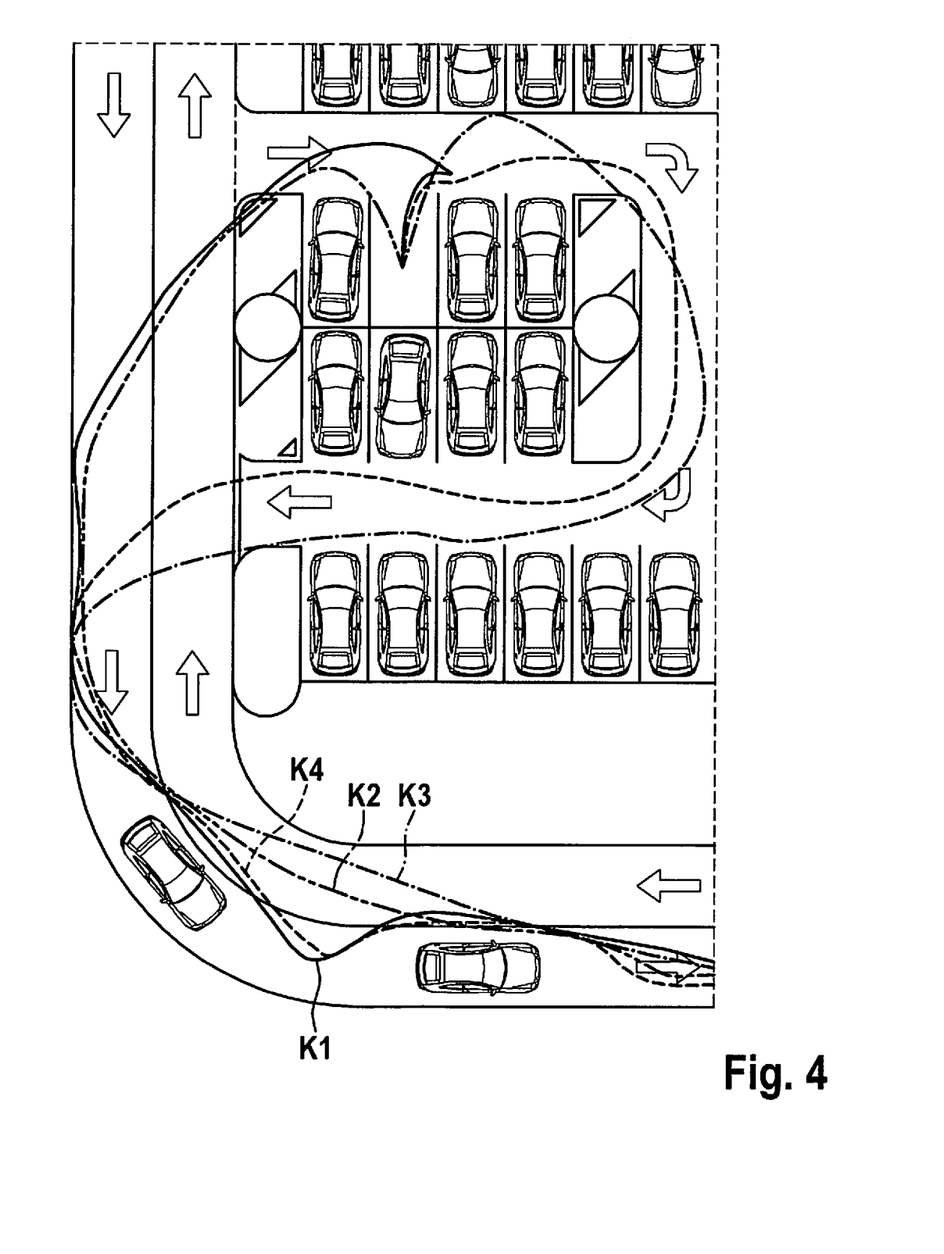
FIG. 4 shows exemplary trajectories for different rule weightings in the case of two rules.

In the above-outlined example situation, a vehicle is to reach an exit of the parking facility from a parking spot, and a trajectory planning is to be carried out for this purpose. The situation is shown in FIG. 4, two parked vehicles being present on the lane for the exit direction. The target condition is that the vehicle is to leave the parking facility on the bottom right on the correct lane and in the correct direction.

The non-violatable conditions correspond to the condition that the vehicle must not traverse other vehicles or other structural obstacles. The rules correspond to:
Rule 1: The vehicle is not to drive in the wrong direction on the lane at any time.
Rule 2: The vehicle is to avoid a lane change.
As shown in FIG. 4, four trajectories result for different cost amounts for rule violations.

| | Rule2 | |
|---|---|---|
| Rule1 | No lane change $VK_{var,i,r} = 1$ | No lane change $VK_{var,i,r} = 50$ |
| Wrong driving direction $VK_{fix,i,r} = 0$ | K1 | K2 |
| Wrong driving direction $VK_{fix,i,r} = 10$ | K4 | K3 |

Resulting curves K1 through K4 correspond to the respective weightings derivable from the table.

Figure 5:
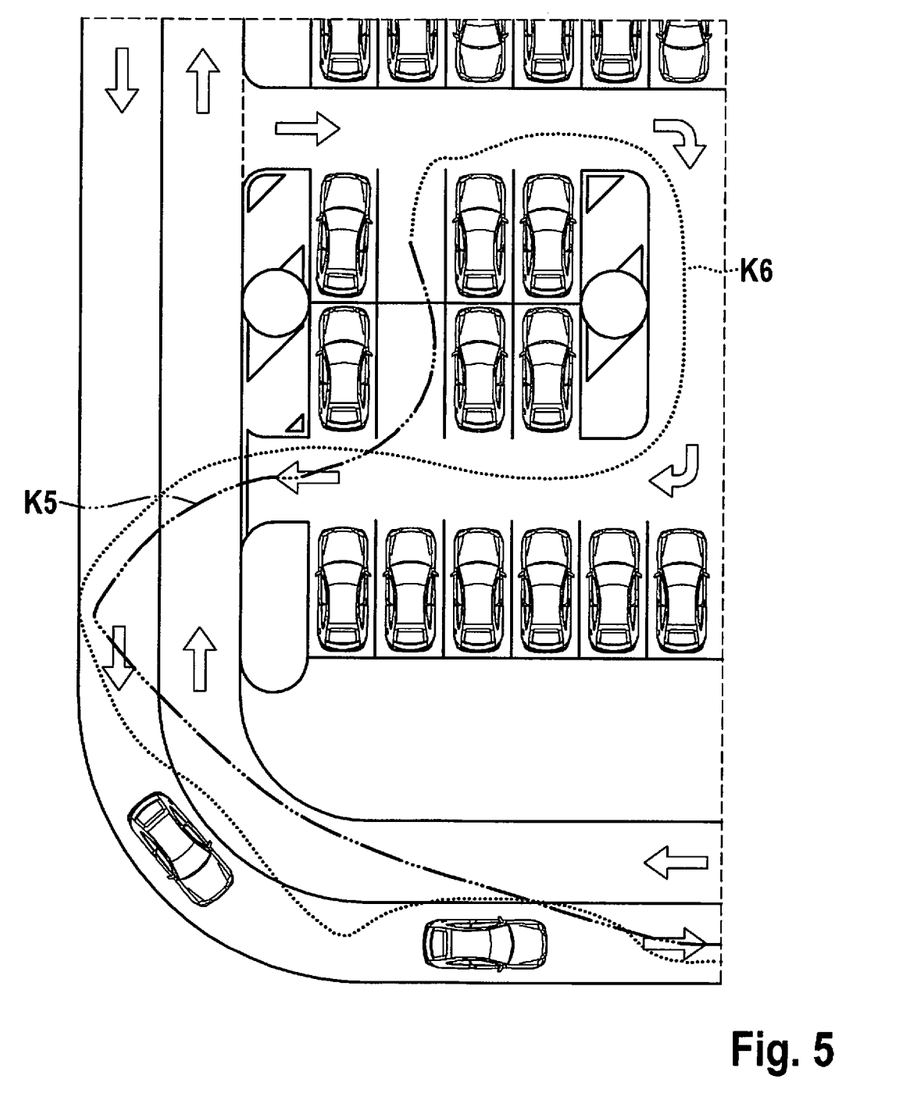
FIG. 5 shows exemplary trajectories for different rule weightings in the case of one further rule.

To illustrate the flexibility of the method, it may be expanded by a rule according to which it is not permissible to traverse a free parking spot. This rule may be provided with a variable cost amount. In combination with the two above-defined rules, trajectory curves K5, K6 shown in FIG. 5 result for two cost amounts selected by way of example (K5: low cost amount; K6: high cost amount) for the third rule. It is apparent that, depending on weighting, the trajectory planning provides that the free parking spot may be traversed.

What is claimed is:

1. A method for guiding a movable object along a movement trajectory, the method comprising:
determining, by a control unit of the moveable object, the movement trajectory for the movable object in a rule-based trajectory planning system, by performing the following:
performing a trajectory planning based on a minimization of overall costs according to a cost function to determine the movement trajectory, the cost function taking violation costs into consideration which arise for each trajectory section of a plurality of trajectory sections of the movement trajectory from a potential respective rule violation of one or multiple violatable rules with respect to the trajectory section, wherein the rule violation includes a state rule violation and/or a transition rule violation, the state rule violation indicating a violation of a state rule which indicates an impermissible state of the movable object, and the transition rule violation indicating a violation of a transition rule which indicates an impermissible state transition, wherein each state rule violation is assigned a time-dependent cost amount of the violation costs, and each transition rule violation is assigned a fixed or time-independent cost amount of the violation costs, so that the overall costs for a movement trajectory for each trajectory section which violates a violatable rule depend on the time-dependent or fixed cost amount assigned to the violated rule; and
controlling, by the control unit, the movable object to move the moveable object along the movement trajectory;
wherein the time-dependent cost amount assigned to each state rule violation is dependent on a duration of time that the trajectory section violates the state rule; and
wherein at least one of the plurality of trajectory sections violates at least one state rule.
2. The method of claim 1, wherein the control unit controls_steering interventions and forward movements of the movable object as a function of the movement trajectory.

3. The method of claim 1, wherein driving instructions for guiding the movable object are output as a function of the movement trajectory.

4. A movable object, comprising:
a control unit configured to determine a movement trajectory for a movable object, in a rule-based trajectory planning system, the control unit configured to carry out a trajectory planning based on a minimization of overall costs according to a cost function to determine the movement trajectory, the cost function taking violation costs into consideration which arise for each trajectory section a plurality of trajectory sections of the movement trajectory from a potential respective rule violation of one or multiple violatable rules with respect to the trajectory section;
wherein the rule violation includes a state rule violation and/or a transition rule violation, the state rule violation indicating a violation of a state rule which indicates an impermissible state of the movable object, and the transition rule violation indicating a violation of a transition rule which indicates an impermissible state transition, and
wherein each state rule violation is assigned a time-dependent cost amount of the violation costs, and each transition rule violation is assigned a fixed or time-independent cost amount of the violation costs, so that the overall costs for a movement trajectory for each trajectory section which violates a violatable rule depend on the time-dependent or fixed cost amount assigned to the violated rule;
a drive system;
a steering system; and
a sensor system to detect surroundings of the object;
wherein the control unit is configured to activate the drive system and the steering system as a function of surroundings states, in particular positions of surroundings objects and surroundings areas, to move the object along the movement trajectory;
wherein the time-dependent cost amount assigned to each state rule violation is dependent on a duration of time that the trajectory section violates the state rule; and
wherein at least one of the plurality of trajectory sections violates at least one state rule.

5. A non-transitory computer readable medium on which is stored a computer program having program code for determining a movement trajectory for a movable object in a rule-based trajectory planning system, the program code, when executed by a control unit of the movable object, causing the control unit to perform the following:
performing a trajectory planning based on a minimization of overall costs according to a cost function to determine the movement trajectory, the cost function taking violation costs into consideration which arise for each trajectory section of a plurality of trajectory sections of the movement trajectory from a potential respective rule violation of one or multiple violatable rules with respect to the trajectory section, wherein the rule violation includes a state rule violation and/or a transition rule violation, the state rule violation indicating a violation of a state rule which indicates an impermissible state of the movable object, and the transition rule violation indicating a violation of a transition rule which indicates an impermissible state transition, wherein each the state rule violation a time-dependent cost amount of the violation costs, and each transition rule violation is assigned a fixed or time-independent cost amount of the violation costs, so that the overall costs for a movement trajectory for each trajectory section which violates a violatable rule depend on the time-dependent or fixed cost amount assigned to the violated rule;
controlling, by the control unit, the movable object to move the object along the movement trajectory;
wherein the time-dependent cost amount assigned to each state rule violation is dependent on a duration of time that the trajectory section violates the state rule; and
wherein at least one of the plurality of trajectory sections violates at least one state rule.

6. The non-transitory computer readable medium of claim 5, wherein the time-dependent cost amount is ascertained by multiplication with a duration which is needed to move the object along the particular trajectory section.

7. The non-transitory computer readable medium of claim 5, wherein the movable object includes a vehicle.

8. The method of claim 1, wherein the movable object includes a vehicle.

9. The method of claim 1, wherein the time-dependent cost amount is ascertained by multiplication with a duration which is needed to move the object along the particular trajectory section.

10. The method of claim 1, wherein the trajectory planning includes the ascertainment of multiple trajectory candidates from which the trajectory candidate having the lowest overall costs is selected as the movement trajectory.

11. The method of claim 1, wherein the trajectory planning includes a sampling-based search method or rapidly exploring random tree (RRT*) method.

12. The method of claim 9, wherein the trajectory planning includes creating a tree whose nodes indicate states and/or positions of the object, and whose edges indicate trajectory sections between the positions of the particular nodes, and
wherein the creating of the tree includes:
providing a new node which corresponds to a sampled position of the object;
determining multiple paths from the new node to the starting node of the tree;
ascertaining overall costs for the multiple paths; and
connecting the new node to the preceding node to which the path having the lowest overall costs belongs.

13. The method of claim 1, wherein the cost function is formulated according to an optimization goal which takes a duration for negotiating the respective trajectory section into consideration.

* * * * *